United States Patent [19]

Roovers

[11] Patent Number: 5,154,675
[45] Date of Patent: Oct. 13, 1992

[54] PROFILED BELT ELEMENT

[75] Inventor: Gijsbertus C. F. Roovers, Goirle, Netherlands

[73] Assignee: Van Doorne's Transmissie B.V., Tilburg, Netherlands

[21] Appl. No.: 673,691

[22] Filed: Mar. 21, 1991

[30] Foreign Application Priority Data

Jun. 5, 1990 [NL] Netherlands ............... 9001263

[51] Int. Cl.$^5$ ............................................. F16G 1/24
[52] U.S. Cl. ................................................. 474/242
[58] Field of Search .................... 474/201, 240–244

[56] References Cited

U.S. PATENT DOCUMENTS

| | | | |
|---|---|---|---|
| 4,303,403 | 12/1981 | Lamers | 474/201 |
| 4,854,919 | 8/1989 | van Lith | 474/25 |
| 4,900,296 | 2/1990 | Schmidt | 474/242 |
| 4,906,225 | 3/1990 | Van Lith | 474/242 |
| 4,976,663 | 12/1990 | Hendrikus | 474/242 |

FOREIGN PATENT DOCUMENTS 2414891 10/1975 Fed. Rep. of Germany .
59-17044 1/1984 Japan .

Primary Examiner—Thuy M. Bui
Attorney, Agent, or Firm—Pennie & Edmonds

[57] ABSTRACT

Transverse elements (9) for a driving belt (7) abut with their principal sides (21, 22) against one another. At least one side has a profiling being convex to allow a misalignment between discs (1, 2) and (4, 5) where between the belt (7) is running to be absorbed by effecting a tilting of neighboring elements.

15 Claims, 2 Drawing Sheets

PROFILED BELT ELEMENT

The invention relates to a cross element for an assembled driving belt, said driving belt comprising one or more endless carriers having cross elements provided thereon, in such a manner that the cross elements abut against the principal side of adjacent cross elements.

Such cross elements and driving belts are known, e.g. from European Patent 0014013. Said driving belt is used in continuously variable transmissions for power transmission between the pulleys of the transmission. Said pulleys each comprise two conical discs, at least one of said discs being constantly movable in axial direction. By displacing the axially movable disc the radial position of the driving belt between the pulleys, and with it the transmission ratio of the transmission, is adjusted in a known manner. A known problem with this type of transmission, as is described in detail in US-A-4,854,919, is that the pulleys, due to the geometry of the transmission, are not aligned along an significant part of the transmission range, as a result of which the driving belt of necessity runs out of alignment between the pulleys. This drawback can be overcome to a slight extent by means of the measures described in the above-mentioned U.S. Pat. No. US-A-4,854,919. The problem remains, however, that the driving belt keeps running out of alignment with a large number of transmission ratios, as a result of which the driving belt is heavily loaded and its stability is not optimal.

The object of the present invention is to overcome the drawbacks mentioned and that objective is accomplished by a cross element mentioned in the preamble, which is characterized in that at least one of the principal sides is provided with a profiling, in such a manner that the adjacent cross elements can tilt with respect to each other about a radial of the driving belt.

The measure the invention proposes makes it possible for the cross elements to align themselves with respect to each other about a radial of the driving belt, and thus to absorb the misalignment of the driving belt. As a result of this the load of the driving belt remains much lower than with the known driving belts. Furthermore a much better stability is obtained.

According to a further elaboration of the inventive concept at least one of the principal sides of each cross element is convex. This convex profiling may extend from edge to edge, but it may also concern a limited portion of the principal side. Preferably the radius of curvature of the convex profiling is large, so that the Hertze contact stresses remain limited. Moreover, in view of the large number of cross elements present in the driving belt a large fillet radius is to be preferred with a view to an enhanced stability.

According to the invention the profiling may furthermore comprise a tilting zone. Said tilting zone may describe a bevel or a recessed portion, whereby the tilting zone may either describe a roll-off area or be determined by a more or less sharp edge.

From the aforesaid European Patent 0014013 it is known that the various elements may also have a tilting zone in the radial direction of the driving belt. According to the invention both tilting zones are preferably integrated in a spherically profiled principal plane.

From said European Patent 0014013 it is furthermore known to provide the cross element with a so-called projection/recess, which couples the adjacent cross elements in certain positions, inter alia resulting in an enhanced stability. The profiling according to the present invention may be used independently of a projection/recess, a combination of the two is preferred, however. In case no projection/recess is provided, however, the profiling is preferably provided in the shape of a cross according to the invention, as a result of which the profiling takes over the projection/recess function to a significant degree.

The invention will be explained hereafter, with reference to a number of embodiments and a drawing, in which:

FIG. 2b is a plan view of the cross element of FIG. 2a;

FIG. 2c is a side elevational view of the cross element of FIG. 2a;

FIG. 7c is a side elevational view of the embodiment of FIG. 7a;

FIG. 9 is a plan view of an assembled driving belt in a position of misalignment, with cross elements according to FIG. 3a.

Figure 1:
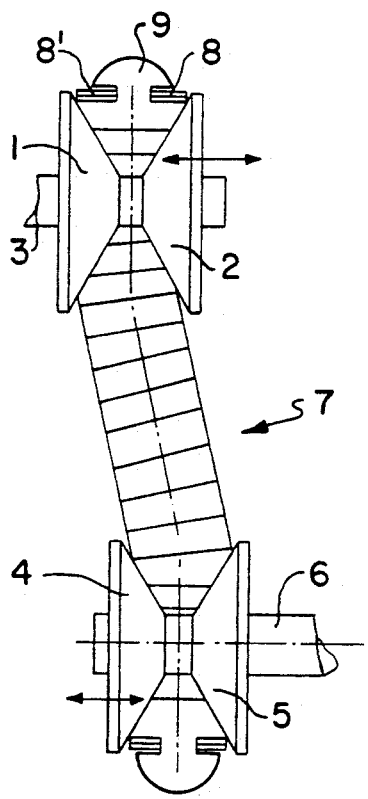
FIG. 1 is a diagrammatic illustration of a continuously variable transmission.
Figure 2A:
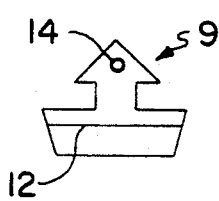
FIG. 2a is a front elevational view of a prior art cross element.
Figure 2B:
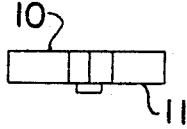
Figure 2C:
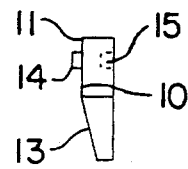

FIG. 1 diagrammatically illustrates a continuously variable transmission. Said transmission comprises a first pulley having conical discs 1, 2, which are placed on a drive shaft 3. The second pulley comprises conical discs 4, 5, which are mounted on an outgoing shaft 6. A driving belt 7 is provided between the pulleys, said driving belt in this case comprising two endless carriers 8, 8′, on which a large number of cross elements 9 are placed. The conical discs 2, 4 are axially movable, as a result of which the radial position between the pulleys of the driving belt 7 and with it the transmission ratio can be adjusted. As is illustrated somewhat exaggerated in this Figure, the geometry of the transmission is such that the driving belt 7 between the pulleys (1, 2 and 3, 4) runs out of alignment for a large number of transmission ratios. For the further elaboration of this reference is made to US-A-4,854,919. It will be apparent that because of this misalignment the load on the driving belt is considerable, and that the stability of the transmission is reduced. This is also apparent from the configuration of the prior art cross element 9 (FIGS. 2a-c), with flat principal sides 10, 11, which are heavily loaded during the period that misalignment occurs.

According to the invention the above problems of the driving belt according to prior art can be overcome by profiling at least one of the principal sides of the driving belt.

Figure 3:
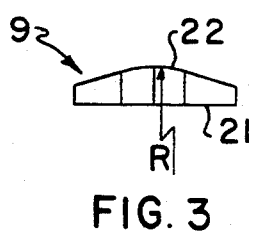
FIG. 3 is a plan view of a first embodiment of the invention, having complete convex profile.
Figure 4:
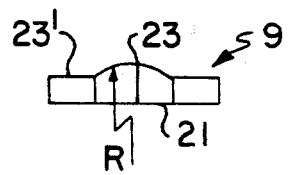
FIG. 4 is a plan view of a second embodiment of the invention, having a partially convex profile.

This profiling may be convex. FIG. 3 shows such a cross element with a completely convex surface for the principal side 22 and a flat principal side 21, whilst in FIG. 4 only a partially convex surface 23 is provided on an otherwise flat principal side 23'. The convex surface 23 may e.g. be welded on. It will be apparent that the position of the highest point of the convex part can be selected freely, dependent on the circumstances. The radius of curvature of the convex surface may be selected freely, dependent on the circumstances, and may be small thereby, e.g. smaller than or considerably smaller than one meter, preferably the radius R of the convex curvature is large. The advantage of this is that in case of contact between the adjacent cross elements the Hertze contact stresses remain limited. Otherwise such a large radius of curvature does not constitute a drawback for the intended tilting of the cross elements with respect to each other, as because of the large number of cross elements present in the driving element the misalignment can be absorbed by a large number of cross elements. As a result the amount of tilting of adjacent cross elements with respect to each other can remain very limited, whilst it is still possible to absorb the misalignment. Even a radius of curvature of e.g. one or a few meters has appeared to be still acceptable thereby.

Figure 9:
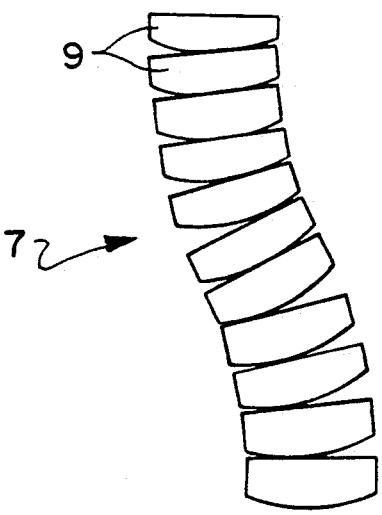

In FIG. 9 illustrates, slightly exaggerated, the result of the convex principal side according to FIG. 3 in an assembled driving belt during misalignment. A very limited tilting of the adjacent cross elements 9 with respect to each other can absorb a very large misalignment without any difficulty. The cross elements 9 are only very slightly loaded thereby, whilst the overall stability will increase.

Figure 5:
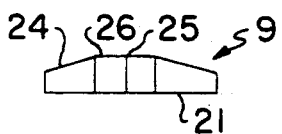
FIG. 5 is a plan view of a third embodiment of the invention, having a tilting zone.

A similar result can be achieved with the embodiment according to FIG. 5, wherein the principal side comprises a flat part 25 and a slanting part 24. The width of the flat part 25 and that of the slanting part 24 can be optimized independently of their use. Via a tilting zone 26 the flat part 25 blends into the slanting part 24. The tilting zone may be a roll-off area, e.g. a fillet, or a more precisely defined line.

Figure 6A:
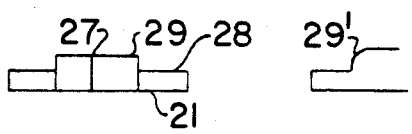
FIG. 6a is a plan view of a fourth embodiment of the invention, having a recessed part.
Figure 6B:
FIG. 6b is a cross element according to FIG. 6a, in this case provided having a roll-off zone.

The embodiment according to FIG. 6 is comparable herewith, the principal side of said embodiment comprising a flat part 27 and a recessed part 28, which are mutually bounded by a roll-off zone in the shape of e.g. a radius forming a roll-off area 29' (FIG. 6b) or a more precisely defined boundary 29 (FIG. 6a).

Figure 7A:
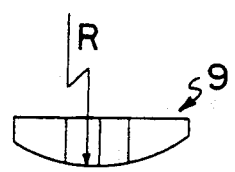
FIG. 7a is a plan view of a fifth embodiment of the invention, having a profiling.

As is illustrated in FIG. 2 the prior art cross element usually comprises a tilting zone 12 as well, with a radius of curvature parallel to the driving belt, as a result of which the principal side 11 blends into a slanting part 13. This enables the curvature of the driving belt. According to the invention the principal side 11, the roll-off zone 12 and the bevel 13 according to prior art and the profiling according to the invention can be combined advantageously into a spherical principal plane, as is illustrated in FIG. 7. The cross element according to FIG. 7c thus comprises a convexity in two perpendicular directions R and R'.

Figure 7B:
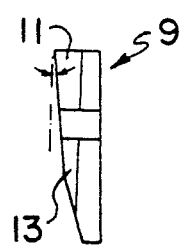
FIG. 7b is a side elevational view of the embodiment of FIG. 7a, having a convex/bevelled profiling.
Figure 7C:
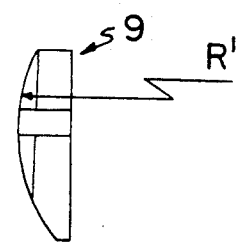

According to the embodiment of FIG. 7b not only the bevel 13 but also the principal plane 11 have a slight slant, as a result of which the specific curvature properties of the driving belt can be enhanced in an advantageous manner.

Figure 8:
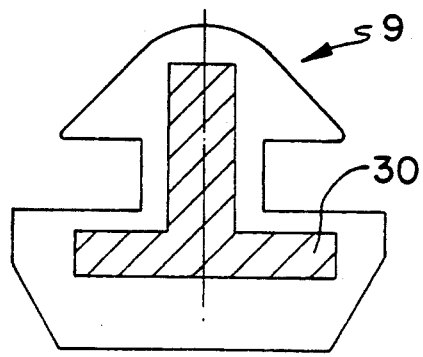
FIG. 8 is a front elevational view of a sixth embodiment of the invention, having a cross profile.

FIG. 2 furthermore shows that the prior art cross element is usually provided with a projection 14 and a complementary recess 15. In certain circumstances this projection/recess 14, 15 effects a coupling of adjacent cross elements, as a result of which inter alia the stability of the driving belt is enhanced. The present invention, in which at least one of the principal sides is profiled, can be used advantageously in combination with a projection/recess 14, 15 without any problem. It is noted explicitly in this context, however, that the present invention can also be used without a projection/recess as well. If the profiling according to the invention can be formed to a certain shape, said profiling can take over the action of the projection/recess. Such a shape of the profiling is e.g. illustrated in FIG. 8, in which the profiling is provided in the shape of a cross 30. As a result the projection/recess 14, 15 may be left out without its function being lost.

It will be apparent that the invention is not limited to the illustrated embodiments, but that a great deal of alternative embodiments are conceivable within the framework of the inventive concept, which are considered to form part of the present invention.

Thus the profiling may e.g. consist of two contact zones, which are provided in the tilting zone and at the location of the aforesaid projection/recess respectively.

I claim:

1. A cross element for an assembled driving belt, said driving belt comprising one of more endless carriers having cross elements provided thereon with principal sides, in such a manner that the cross elements abut against the principal sides of adjacent cross elements, characterized in that at least one of the principal sides is provided with a profiling, in such a manner that the adjacent cross elements can tilt with respect to each other about a radial of the driving belt.

2. A cross element according to claim 1, characterized in that said profiling is convex.

3. A cross element according to claim 2, characterized in that said principal side has a convex profiling extending from edge to edge.

4. A cross element according to claim 2, characterized in that part of said principal side has a convex profiling.

5. A cross elements according to any one of the claims 1-4, characterized in that the radius of the convexly profiled surface is large.

6. A cross element according to claim 1, characterized in that said profiled principal side comprises a tilting zone.

7. A cross element according to claim 6, characterized in that said profiled principal side slopes down from the tilting zone.

8. A cross element according to claim 6, characterized in that said profiled principal side is recessed from the tilting zone to the edges.

9. A cross element according to any one of the claims 6-8, characterized in that said tilting zone is a defined tilting line.

10. A cross element according to any one of the claims 6-8, characterized in that said tilting zone is a roll-off area.

11. A cross element according to any one of the claims 6-8, characterized in that said profiling of the principal side is also such that it enables the curvature of the driving belt.

12. A cross element according to claim 11, characterized in that the profiling of the principal side is spherical.

13. A cross element according to any one of the claims 6-8, characterized in that said profiling is formed by a contact zone at the location of the tilting zone and a contact zone at the location of a projection/recess.

14. A cross element according to any one of the claims 6-8, characterized in that said profiling is cross-shaped.

15. A driving belt provided with one or more cross elements according to any one of the claims 6-8.

* * * * *